No. 715,859. Patented Dec. 16, 1902.
A. A. PHIPPS.
SELF HEATING BRANDING IRON.
(Application filed Feb. 1, 1902.)
(No Model.) 2 Sheets—Sheet 1.

WITNESSES
John Carolan
Helen L. Oberteuffer

INVENTOR
Abner A. Phipps
BY
W. B. Hutchinson
ATTORNEY

THE NORRIS PETERS CO., PHOTO-LITHO., WASHINGTON, D. C.

No. 715,859.  
A. A. PHIPPS.  
SELF HEATING BRANDING IRON.  
(Application filed Feb. 1, 1902.)  
(No Model.)

Patented Dec. 16, 1902.

2 Sheets—Sheet 2.

WITNESSES  
John Carolan  
Helen L. Obertuffer

INVENTOR  
Abner A. Phipps,  
BY  
W. B. Hutchinson,  
ATTORNEY

UNITED STATES PATENT OFFICE.

ABNER A. PHIPPS, OF NEW YORK, N. Y.

SELF-HEATING BRANDING-IRON.

SPECIFICATION forming part of Letters Patent No. 715,859, dated December 16, 1902.

Application filed February 1, 1902. Serial No. 92,113. (No model.)

*To all whom it may concern:*

Be it known that I, ABNER A. PHIPPS, of the city, county, and State of New York, have invented certain new and useful Improvements in Self-Heating Branding-Irons, of which the following is a full, clear, and exact description.

My invention relates to improvements in that class of branding-irons which are provided with means for keeping the iron hot while in use, to the end that it can be repeatedly used without reheating.

The object of my improvements is to produce a strong and compact burner wherein the hydrocarbon is quickly and highly volatilized and directed in a steady flame and intense heat against the branding-iron.

A further object is the provision of means for preventing the escape of air from the reservoir to the burner during a temporary inversion of the reservoir.

To these ends my invention consists of certain features of construction and combinations of parts, which will be hereinafter fully described and claimed.

Reference is to be had to the accompanying drawings, forming part of this specification, in which similar figures of reference refer to similar parts throughout the several views.

Figure 1:
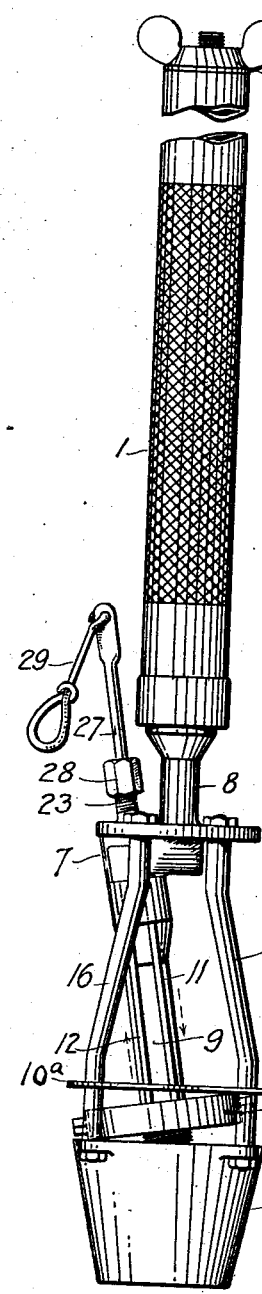
Figure 3:
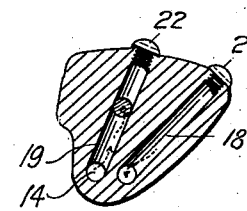
Figure 4:
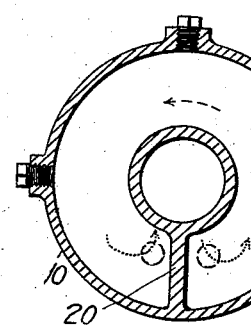
Figure 2:
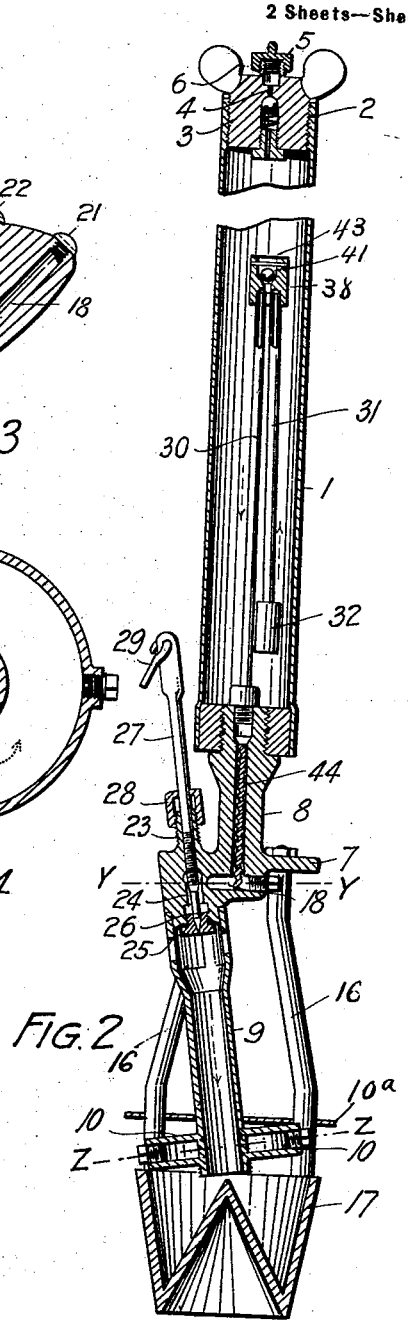
Figure 6:
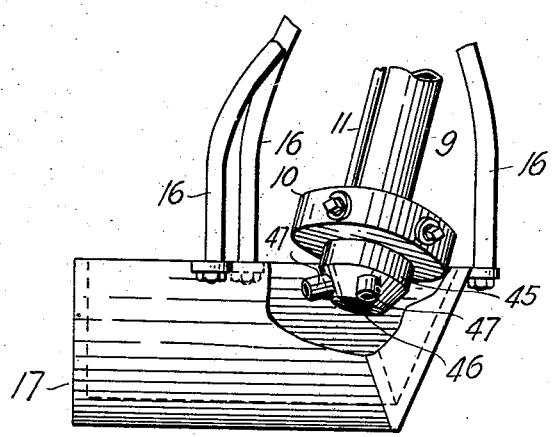
Figure 5:
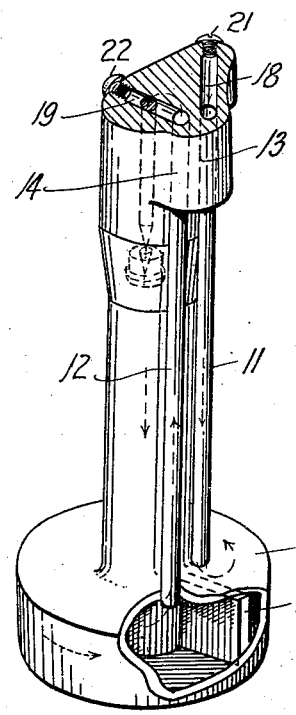
Figure 7:
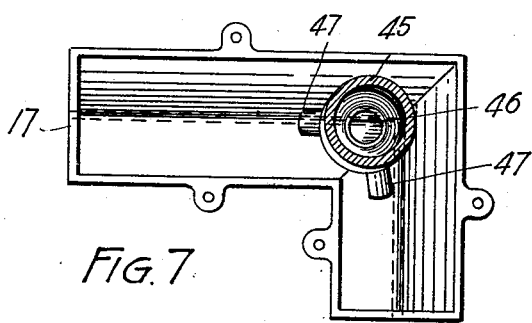
Figures 8, 9, 10:
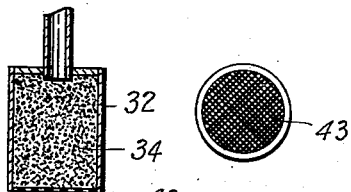

Figure 1 shows my improved branding-iron in side elevation. Fig. 2 is a vertical section of the same, taken centrally through the handle or reservoir, burner, and brand. Fig. 3 is an enlarged horizontal section on the line $y$ $y$ of Fig. 2, taken through the bores or oil-passages. Fig. 4 is an enlarged horizontal section on the line $z$ $z$ of Fig. 2, taken centrally through the generator or volatilizer. Fig. 5 is a perspective view of the burner, partly in section, the section being taken horizontally through the bored passages of the head and showing the course of the oil and gas, a portion of the volatilizer being broken away to show the annular chamber and the partition therein. Fig. 6 is a perspective view showing the flame-tube nozzle and its spouts as arranged for an L-brand. Fig. 7 is a horizontal section of the same, showing the disposition of the spouts of the flame-tube nozzle. Fig. 8 is an enlarged section of the filter at the beginning of the feed-tube. Fig. 9 is an enlarged section in detail of the valve at the bend of the feed-tube; and Fig. 10 is an end view of the same, showing the screen.

The branding-iron has a tubular handle 1, forming a reservoir for the hydrocarbon. In the top of the handle is a threaded opening 2, forming a filling-hole, through which the oil is inserted. A screw-plug 3 closes said filling-hole. This screw-plug 3 has a central bore or air-passage 4, and in this bore is a valve 5, of any well-known construction. A screw-cap 6 seals the air-passage 4. The burner, which is screwed to the lower end of the tubular handle or reservoir, consists of a flanged casting or head 7, a tubular neck part 8, a flame-tube 9, brazed to said flanged casting 8, and a generator or volatilizer 10, cast integral with said flame-tube. Pipes 11 and 12 lead from vertical bores or passages 13 and 14 (see Fig. 5) in the head down along the side of the flame-tube 9 to the volatilizer 10. A needle-valve 26, located in the head-casting, controls the flow of oil and vapor. Rods 16, fastened to the flange of the head 7, extend downward past the generator or volatilizer 10 and are fastened to and support the brand 17.

The neck 8 of the burner is hollow down as far as the transverse bored passage 18 in the head. The bored passage 18 is let in from the side of the burner connecting with the vertical bore of the neck and also meeting an upwardly-bored passage 13, which is let in from the under side of the head just at the side of the brazed junction of the flame-tube. A pipe 11 is fitted and brazed into this bore 13 and extends down along the side of the flame-tube to the volatilizer 10, into which it opens. The volatilizer 10 is an annular chamber cast integral with and near the bottom of the flame-tube 9, which passes through it. Another pipe 12 connects the volatilizer with another upwardly-bored passage 14 in the head, which connects with another transverse passage 19, which is let in from the side of the head. The bored passages 18 and 19 are plugged by screw-plugs 21 and 22.

On the top of the head 7 and just over the passage 19 is a nipple 23. Passing through this nipple and through the transverse passage 19 a bored passage 24 leads down into the flame-tube.

The openings in the top of the generator or volatilizer for the pipes 11 and 12 are close together, and in the small space between these openings is a gate or partition 20, (see Fig. 5,) so that the partially-volatilized oil will pass into one opening, around through the annular chamber of the volatilizer, and up through the pipe 12.

Into the bottom of the bored passage 24 is screwed the bushing 25, forming the seat for the needle-valve 26, the stem 27 of which is threaded into the said passage and projects up through the nipple 23 and packing-box 28.

It is desirable that the handle of the needle-valve extend somewhat above the burner, so that in operating it the hand may be away from the heat; but that it may not project too far from the support of the packing-box or journal it is jointed at about its middle, the upper part 29 hanging pendent when not in use. The ordinary knuckle-joint is used, which does not in any way alter the operation of turning the valve-stem.

For the purpose of preventing the compressed air of the reservoir from entering the burner and extinguishing it during a temporary inversion of the reservoir I provide the return-tube 30 31. The lower end of the arm 30 is screwed into the hollow feed-bore of the neck 8. The other arm 31 has at its lower end a filter-box 32, (see Fig. 8,) which is filled with any suitable filtrant 34. A screen 35 (see Fig. 10) is fastened across the end of the filter-box. The upper ends of the tube-arms are soldered into bores 36 37 (see Fig. 9) in the valve-block 38 and are connected through a passage 39 therein. Opening into this passage 39 is the valved opening 40, at the bottom of which is the gravity ball-valve 41. A pin 42 across the opening 40 confines the ball, but is just far enough above it to permit of a slight movement of the ball. A screen 43, similar to that shown in Fig. 10, covers the end of the opening 40. Thus when the branding-iron is held downward the oil is forced through the filter 32 and up the tube-arm 31, across the passage 39, and down through the tube-arm 30 into the hollow neck 8 of the burner.

The branding-iron when used is generally held substantially as in Figs. 1 and 2; but if it is momentarily inverted, or partially so, the oil runs to the upper part of the tube, and the air-pressure in the tube 33, supplemented by the gravity of the ball-valve 31, will cause the ball to drop back, so that the oil will pass in around it and the burner will continue to operate, whereas if it were not for the valve the air would rush out without oil and the flame would be extinguished. Lest there be too free a flow through the hollow neck, I place in the hollow thereof a spiral or screw-threaded rod 44 (see Fig. 2) to serve as a baffle.

In order to obtain the initial heat for the burner, the needle-valve 21 is opened and the oil is forced out and down the flame-tube into the hollow of the brand-iron and is there ignited. The heat from this oil soon volatilizes the oil in the generator or volatilizer 10, from whence it passes out by the needle-valve 70 as gas. Thereafter the heat from the burner itself volatilizes the oil. The brand-irons of whatever design are for this purpose always made cup or trough shaped and for the further purpose of catching the flame from the burner and preventing the burning of the animal or object to be branded.

Between the brand and the head of the burner I provide a sheet-metal plate $10^a$, which serves as a hood to keep the heat and flame down on the brand and prevent it from rebounding against or toward the handle and unnecessarily heating it. Such hood or plate may be placed above or below the volatilizer or may form a part of the volatilizer, but preferably above, as shown in Fig. 1, in order that the volatilizer may the better receive the intense heat of the rebounding flame from the brand. This hood or plate is secured in place in any suitable manner, but preferably by holes in its corners, through which the rods 16 pass. Pins driven through the rods above the plate prevent the displacement.

In using brands such as the reversed-L brand (shown in Figs. 6 and 7) the flame from the burner should be directed against the entire surface; but because of the angles and turns of the characters of the brand it is probable that a single opening from the flame-tube would not distribute the flame equally over the inner surface of the brand. I therefore provide screw-threads on the end of the flame-tube and screw thereon a choke-bore nozzle 45, having main outlet 46, pointing straight down, and the spouts 47, which point toward the different arms of the brands, as seen in Fig. 7. The main outlet 46 of the nozzle is contracted, so as to deflect some of the flame through the spouts 47 into the different angles or arms of the brand. The reservoir being partially filled with oil and the filling-hole closed by the screw-plug 3, connection is then made with some source of compressed air, such as the ordinary hand-pump or compressed-air tank, preferably by means of a flexible tube, which is coupled to the threaded nipple 5, provided for the cap 6, and sufficient air-pressure is introduced into the reservoir upon the oil. The oil is thus forced through the return-tube into the neck of the burner, from whence it passes through the transversely-bored passage 18 in the direction of the arrows shown in Figs. 3 and 5, thence down the upwardly-bored passage 13, (see Fig. 5,) into and down the pipe 11, and into the annular chamber of the vaporizer, around through which it passes, (being volatilized or gasified on its way,) and up through the pipe 12 into the upwardly-bored passage 14, thence into the transversely-bored passage 19, and through the passage 24 and needle-valve seat 25 into the flame-tube, where the vapor is ignited and projects with intense heat against the brand 17.

While I have shown and described the burner of my device as having the head cast separately from the flame-tube and pipes 11 and 12, it is obvious that the burner may be cast in one piece, and the oil passages or conduits, which are shown as formed by the pipes 11 and 12, may be formed by boring from the top of the head down through a thickened portion of the walls of the flame-tube into the annular chamber of the volatilizer. It is also obvious that instead of supplying the compressed air from a distant source I may, and in most cases would, use a pump located within and at the top of the reservoir or handle. Such a construction is shown in my application Serial No. 92,115 for improvements on this device.

The tubular reservoir is knurled for some distance up from its lower end for the purpose of giving a better grip or hold for the hand.

The burner may be used without the reservoir shown and oil supplied to it from a distant source through a tube connection and also without a cup or trough shaped brand-iron. In the latter case, however, it must be held close to the object which is being heated in order that the flame may rebound against the volatilizer.

Having now fully described my invention, what I claim, and desire to secure by Letters Patent, is—

1. In an apparatus of the kind described, the combination with the branding-iron and the flame-tube discharging thereon, of the volatilizer encircling the flame-tube and comprising an inclosed drum having a radial division therein, a source of oil-supply delivering to the volatilizer, a duct delivering from the volatilizer into the upper portion of the flame-tube, and a valve controlling the fluid-supply to the flame-tube.

2. The combination with the oil-containing reservoir the branding-iron, and the hydrocarbon-burner arranged beneath the reservoir, the said burner comprising a flame-tube leading from the head and discharging upon the branding-iron, a volatilizing-chamber provided with a partition, ducts leading to said chamber and on different sides but in close proximity to said partition, one duct leading to said reservoir and the other to the flame-tube, the said chamber encircling the flame-tube, and a valve controlling the fluid-supply to the flame-tube.

In testimony whereof I have signed my name to this specification in the presence of two subscribing witnesses.

ABNER A. PHIPPS.

In presence of—
   WARREN B. HUTCHINSON,
   EDWARD P. CLARKE.